United States Patent
Watanabe et al.

(10) Patent No.: US 7,212,952 B2
(45) Date of Patent: May 1, 2007

(54) SYSTEM AND METHOD FOR DIAGNOSING ABNORMALITIES IN PLANT CONTROL SYSTEM

(75) Inventors: Shunzo Watanabe, Tokyo (JP); Hideo Hosaka, Tokyo (JP); Mitsuyoshi Okazaki, Tokyo (JP); Seiichi Asatsu, Tokyo (JP); Tatsuo Yamashita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 98 days.

(21) Appl. No.: 11/088,844

(22) Filed: Mar. 25, 2005

(65) Prior Publication Data
US 2005/0203696 A1 Sep. 15, 2005

Related U.S. Application Data

(63) Continuation of application No. PCT/JP03/11727, filed on Sep. 12, 2003.

(30) Foreign Application Priority Data
Sep. 27, 2002 (JP) ............................. 2002-283519

(51) Int. Cl.
G06F 15/00 (2006.01)
(52) U.S. Cl. ...................................... 702/183; 702/182
(58) Field of Classification Search ................ 702/182, 702/183
See application file for complete search history.

(56) References Cited

U.S. PATENT DOCUMENTS 6,909,990 B2 * 6/2005 Okazaki et al. ............. 702/183

FOREIGN PATENT DOCUMENTS

| JP | 64-33697 | 2/1989 |
|---|---|---|
| JP | 5-79952 | 3/1993 |
| JP | 6-123642 | 5/1994 |
| JP | 6-186140 | 7/1994 |
| JP | 7-47400 | 2/1995 |
| JP | 8-263135 | 10/1996 |
| JP | 9-91037 | 4/1997 |
| JP | 11-119823 | 4/1999 |
| JP | 2002-23841 | 1/2002 |

* cited by examiner

Primary Examiner—John E. Barlow, Jr.
Assistant Examiner—Douglas N. Washburn
(74) Attorney, Agent, or Firm—Oblon, Spivak, McClelland, Maier & Neustadt, P.C.

(57) ABSTRACT

Cause of abnormalities of an abnormal state of a control system of a plant of a turbine are estimated and diagnosed from characteristics of abnormal phenomena. By using a control system abnormality cause-and-effect matrix in which characteristics of a plurality of abnormal phenomena constructed on a knowledge base are correlated with a plurality of causes by correlating (weighting) scores, plant devices causing abnormality are inferred and diagnosed.

8 Claims, 9 Drawing Sheets

FIG. 2

| Function (Target device) | Generated phenomenon Characteristics of phenomenon (Cause) | Follow-up with required load — Sudden load change — Not recovered from sudden change | | | | Follow-up with required load — Sudden load change — Recovered while later after sudden change | | | | Load hunting — Hunting | | Load hunting — Certain load zone generated | |
|---|---|---|---|---|---|---|---|---|---|---|---|---|---|
| | | Changing amount less than 5% | Changing amount 5 to 10% | Changing amount 10% or more | Maximum changing trip | Changing amount less than 5% | Changing amount 5 to 10% | Changing amount 10% or more | Maximum changing trip | 0.1 Hz | 0.5 Hz | 0.1 Hz | 0.1 Hz |
| GOV | Large rotary pilot resistance (stick) | 0.167 | 0.167 | 0.167 | 0.333 | | | | | | | | |
| | Rotary pilot edge abnormality | | | 0.167 | | | | | | | | | |
| | Rotary pilot dashpot abnormality | | 0.167 | 0.167 | | | | | | | | | |
| | Shifting of weight spring seating position | 0.167 | 0.167 | 0.167 | | | | | | | | | |
| | Contact between weight and static portion | 0.167 | 0.167 | 0.167 | | | | | | | | | |
| | Falling-off of spindle | | | | 0.333 | | | | | | | | |
| | Disengagement of spindle spring | 0.167 | 0.167 | 0.167 | 0.333 | | | | | | | | |
| | Control oil supply pipe abnormality to GOV | 0.167 | 0.167 | 0.167 | 0.333 | | | | | | | | |
| Backup governor | Rotary pilot edge abnormality | | | | | | | | | 0.5 | 0.5 | | |
| GOV drive | Shifting of set screw | | | | | | | | | 0.5 | 0.5 | | |
| | Worm backlash increase | | | | | | | 0.5 | | 0.5 | 0.5 | | |
| | Electric contact | | | | | | | 0.5 | | 0.5 | 0.5 | | |
| SR | Expansion of piston sliding gap | | | | | 0.5 | 0.5 | | | | | 0.333 | 0.333 |
| | Large piston sliding resistance (stick) | | | | | 0.5 | 0.5 | | | | | | |
| | Piston rod stick | | | | | | | | | | | | |
| | Expansion of piston rod gap (oil leakage) | | | | | | | | | | | 0.333 | 0.333 |

FIG. 3

| (Target device) | (Cause) | Under constant load | | | | | | Occurrence of sudden load change / Not recovered from sudden change / Load being changed | | | | | |
|---|---|---|---|---|---|---|---|---|---|---|---|---|---|
| | | Automatic governor | | Manual governor | | Load limit running | | Automatic governor | | Manual governor | | Load limit running | |
| | | Changing amount 5 to 10% | Changing amount 10% or more | Changing amount 5 to 10% | Changing amount 10% or more | Changing amount 5 to 10% | Changing amount 10% or more | Changing amount 5 to 10% | Changing amount 10% or more | Changing amount 5 to 10% | Changing amount 10% or more | Changing amount 5 to 10% | Changing amount 10% or more |
| GOV | Large rotary pilot resistance (stick) | 1 | 1 | | 1 | | | 1 | 1 | | 1 | | |
| | Rotary pilot edge abnormality | | 64 | | | | | | | | | | |
| | Rotary pilot dashpot abnormality | 1 | 1 | | 1 | | | 1 | 1 | | 1 | | |
| | Shifting of weight spring seating position | 1 | 1 | 1 | 1 | | | 1 | 1 | 1 | 1 | | |
| | Contact between weight and static portion | 1 | 1 | 1 | 1 | | | 1 | 1 | 1 | 1 | | |
| | Falling-off of spindle | 1 | 1 | 1 | 1 | | | 1 | 1 | 1 | 1 | | |
| | Disengagement of spindle spring | | | | | | | | | | | | |
| | Control oil supply pipe abnormality to GOV | | | | | | | | | | | | |
| Backup governor | Rotary pilot edge abnormality | | | | | | | | | | | | |
| | Shifting of set screw | | | | | | | | | | | | |
| GOV drive | Worm backlash Increase | | | | | | | | | | | | |
| | Electric erosion | | | | | | | | | | | | |

FIG. 4

| (Target device) | (Cause) | State of associated device | | | | | | | | |
|---|---|---|---|---|---|---|---|---|---|---|
| | | Weighting factor by running state - for sudden load change | | | | | | | | |
| | | Presence of main steam change | | Change of system frequency | | Presence of reduction in control hydraulic pressure | Presence of change in control hydraulic pressure | Presence of hydraulic hunting | Abnormal vibration of valve | |
| | | Change is present | No change | Change is present | No change | | | | Vibration is present | No vibration |
| | | | | | | Present None | Present None | None | | |
| GOV | Large rotary pilot resistance (stick) | 0.3 | 1 | 0.3 | 1 | 1 | 1 | 0.3 | 0.3 | 1 |
| | Rotary pilot edge abnormality | 0.3 | 1 | 0.3 | 1 | 0.3 | 0.3 | 0.3 | 0.3 | 1 |
| | Rotary pilot dashpot abnormality | 0.3 | 1 | 0.3 | 1 | 0.3 | 0.3 | 0.3 | 0.3 | 1 |
| | Shifting of weight spring seating position | 0.3 | 1 | 0.3 | 1 | 0.3 | 0.3 | 0.3 | 0.3 | 1 |
| | Contact between weight and static portion | 0.3 | 1 | 0.3 | 1 | 0.3 | 0.3 | 0.3 | 0.3 | 1 |
| | Falling-off of spindle | 0.3 | 1 | 0.3 | 1 | 0.3 | 0.3 | 0.3 | 0.3 | 1 |
| | Disengagement of spindle spring | 0.3 | 1 | 0.3 | 1 | 0.3 | 0.3 | 0.3 | 0.3 | 1 |
| | Control oil supply pipe abnormality to GOV | 0.3 | 1 | 0.3 | 1 | 0.3 | 0.3 | 0.3 | 0.3 | 1 |
| Backup governor | Rotary pilot edge abnormality | 0.3 | 1 | 0.3 | 1 | 0.3 | 0.3 | 0.3 | 0.3 | 1 |
| GOV drive | Shifting of set screw | 0.3 | 1 | 0.3 | 1 | 0.3 | 0.3 | 0.3 | 0.3 | 1 |
| | Worm backlash increase | 0.3 | 1 | 0.3 | 1 | 0.3 | 0.3 | 0.3 | 0.3 | 1 |
| | Electric erosion | 0.3 | 1 | 0.3 | 1 | 0.3 | 0.3 | 0.3 | 0.3 | 1 |
| SR | Expansion of piston sliding gap | 0.3 | 1 | 0.3 | 1 | 0.3 | 0.3 | 0.3 | 0.3 | 1 |
| | Large piston sliding resistance (stick) | 0.3 | 1 | 0.3 | 1 | 0.3 | 0.3 | 0.3 | 0.3 | 1 |
| | Piston rod stick | 0.3 | 1 | 0.3 | 1 | 0.3 | 0.3 | 0.3 | 0.3 | 1 |

SYSTEM AND METHOD FOR DIAGNOSING ABNORMALITIES IN PLANT CONTROL SYSTEM

CROSS-REFERENCE TO RELATED APPLICATIONS

This is a Continuation Application of PCT Application No. PCT/JP03/11727, filed Sep. 12, 2003, which was published under PCT Article 21(2) in Japanese.

This application is based upon and claims the benefit of priority from prior Japanese Patent Application No. 2002-283519, filed Sep. 27, 2002, the entire contents of which are incorporated herein by reference.

BACKGROUND OF THE INVENTION

1. Field of the Invention

The present invention relates to a system and a method for diagnosing abnormalities in a plant control system to specify a device which is an abnormality cause by inputting characteristics of an abnormal control state in a plant such as a turbine plant.

2. Description of the Related Art

Generally, a steam turbine of a thermal power plant adjust a rotating speed, load torque, an increase rate of the rotating speed by controlling steam supplied to the turbine.

FIG. 9 is a diagram showing a steam flow of a representative steam turbine and a configuration of a device for controlling the flow.

Steam out of a boiler 101 flows through a main stop valve 102 and a control valve 103 which are arranged in series to drive a high-pressure turbine 104. The steam that has worked on the high-pressure turbine 104 is increased in temperature by a reheater 105, and then flows through a reheat stop valve 106 and an intercept valve 107 which are arranged in series to rotate an intermediate-pressure turbine 108. The steam out of the intermediate-pressure turbine 108 rotates a low-pressure turbine 109, and then flows to a condenser 110. A generator 111 serially connected to the turbines 104, 108 and 109 generates power by a constant rotating speed.

With this configuration, by controlling the plurality of steam valves 102, 103, 106 and 107, rotating speeds of the turbines 104, 108 and 109 are controlled to target rotating speeds.

When abnormalities occur in the steam valves or the like constituting the plant control system, follow-up with a required load becomes impossible. For example, the rotating speeds of the turbines 104, 108 and 109 are not set constant, inevitably causing hunting or the like, generating an abnormality symptom of the control system. When abnormalities deteriorate more, a protective device operates to stop the turbines.

Regarding such an abnormality symptom which does not necessarily stop the turbines, it is important to diagnose which of devices such as the steam turbines is abnormal to find countermeasures.

Conventionally, when an abnormality occurs in the control state of the turbine plant, a plant user has investigated a cause of the abnormality based on an operation manual or experience. When the abnormality cannot be solved by the plant user, a solution of the problem has been sought by making an inquiry to a manufacturer, reporting the abnormal state to ask for diagnosis, or asking for immediate dispatch of engineers.

In most cases, the manufacturer that has received the inquiry listens to characteristics of the abnormal state, and accordingly a field engineer or a control system designer estimates an abnormality cause and makes on-the-spot investigation.

In such a case, in the inquiry of the abnormal state by telephone or the like from the user, there is frequently a shortage of information regarding understanding of the characteristics of the abnormal state, resulting in a long time of narrowing-down cause devices in most cases.

Especially for a plant user at a remote place, engineer dispatch takes considerable time and costs.

Reference Patent Document (Jpn. Pat. Appln. KOKAI Publication No. 08-263135)

Thus, in the conventional control system diagnosis of the turbine plant caused by the turbine control device (steam valve or the like), information understanding such as characteristic understanding of a phenomenon or understanding of a running state when the abnormality occurs is insufficient in most cases. Because of this information shortage, in the manufacturer/service company or the like that has been asked to make an abnormality diagnosis, the engineer must take various cases into consideration to determine the cause of the abnormality. It requires considerable time and labor to solve the problem.

Additionally, there is a demand for diagnoses or the like regarding relatively minor daily abnormalities.

Thus, a primary diagnosis is first executed by a relatively simple method to narrow down target devices. An engineer may perform a detailed diagnosis or investigation as occasion demands. Accordingly, both of the request side and the service side can deal with the problem at low costs within a short time.

Because of the aforementioned conventional situations, there is a demand for a system for automatically making a primary diagnosis, in a relatively simple manner regarding abnormalities of the control system.

BRIEF SUMMARY OF THE INVENTION

A system and a method for diagnosing abnormalities in a plant control system enable simple execution of a primary diagnosis of the abnormalities of the plant control system without taking a long time or high costs.

The control system abnormality diagnosis system of a plant according to the present invention comprises a control system abnormality cause-and-effect matrix in which plural kinds of abnormality causes generated in the control system of the plant are correlated with characteristics of plural kinds of abnormal phenomena generated in the control system. When the characteristics of the abnormal phenomena generated in the control system are input by an abnormal phenomenon input element, the abnormality causes generated in the control system of the plant based on the correlation by the control system abnormality cause-and-effect matrix are analyzed by a cause analysis element from the input characteristics of the abnormal phenomena. Then, the analyzed abnormality causes of the plant are output as diagnosing results by a diagnosing result output element. A plant user can obtain the analyzed diagnosing results of the abnormality causes of the plant only by inputting the characteristics of the abnormal phenomena generated in the control system.

BRIEF DESCRIPTION OF THE SEVERAL VIEWS OF THE DRAWING

FIG. 2 is a table showing partial data contents of a control system abnormality cause-and-effect matrix 6 accompanying system application software 4S of the control system abnormality diagnosis system 1.

FIG. 3 is a table showing partial data contents of a control system abnormality cause-and-effect matrix 6' when running states 65 are classified and set for characteristics 63 (63a, 63b, . . . ) of abnormal phenomena in the control system abnormality cause-and-effect matrix 6 of the control system abnormality diagnosis system 1 of FIG. 2.

FIG. 4 is a table showing a control system abnormality cause-and-effect coefficient matrix 6A in which weighting factors 67 are set with respect to abnormality cause weighting scores 64 when states 66 of associated devices are classified for the characteristics 63 (63a, 63b, . . . ) of abnormal phenomena in the control system abnormality cause-and-effect matrix 6 (6') of the control system abnormality diagnosis system 1 of FIG. 2 or FIG. 3.

DETAILED DESCRIPTION OF THE INVENTION

Next, embodiments of the present invention will be described with reference to the accompanying drawings.

(First Embodiment)

Figure 1:
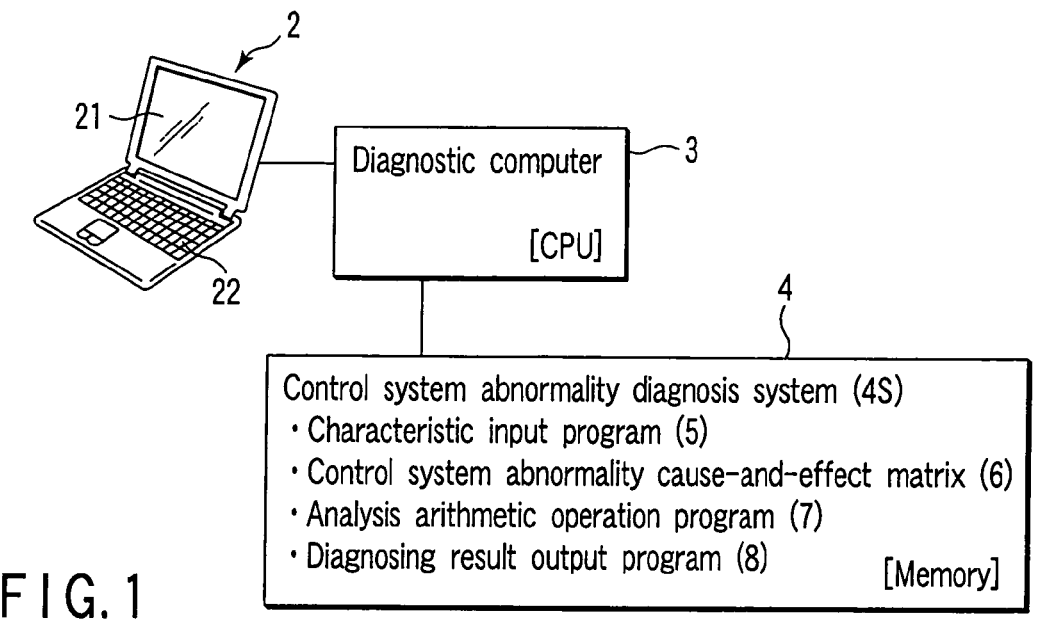
FIG. 1 is a block diagram showing a configuration of a control system abnormality diagnosis system 1 of a turbine plant according to a first embodiment of the present invention.

FIG. 1 is a block diagram showing a configuration of a control system abnormality diagnosis system 1 of a turbine plant according to a first embodiment of the present invention.

This control system abnormality diagnosis system 1 of the turbine plant is implemented by a personal computer (PC) 2 which uses a CPU as a diagnostic computer 3.

The diagnostic computer (CPU) 3 performs an abnormality diagnosis process of a control system of a target plant in accordance with control system abnormality diagnosis system application software 4S recorded in a memory 4 which comprises a hard disk drive and a magnetic disk unit. This control system abnormality diagnosis system application software 4S is started in accordance with a user interface by a monitor (display unit) 21 and a keyboard (input unit) 22 of the personal computer 2 to operate the diagnostic computer 3.

The control system abnormality diagnosis system application software 4S recorded in the memory 4 contains a characteristic input program 5, a control system abnormality cause-and-effect matrix 6, an analysis arithmetic operation program 7, and a diagnosing result output program 8.

The characteristic input program 5 is an abnormal phenomenon input element for inputting characteristics of a control system abnormality of the turbine plant.

The control system abnormality cause-and-effect matrix 6 is a data table for associating characteristics of a plurality of phenomena of control system abnormalities with a plurality of causes.

The analysis arithmetic operation program 7 is a program for performing a cause analysis process from a plurality of characteristics of the control system abnormalities input in accordance with the characteristic input program 5 based on the control system abnormality cause-and-effect matrix 6.

The diagnosing result output program 8 is a program for outputting a diagnosing result in accordance with the cause analysis of the control system abnormalities.

That is, this control system abnormality diagnosis system 1 of the turbine plant performs the process: (1) characteristic data of the control system abnormal state of the turbine plant is input through the user interfaces 21, 22 of the personal computer 2 to the diagnostic computer 3, (2) a target device of an abnormality cause is estimated and analyzed by the control system abnormality diagnosis system application software 4S preinstalled in the memory 4 to set a primary diagnosing result, and (3) a comment is output regarding a necessity of the primary diagnosing result and a detailed diagnosis.

FIG. 2 is a table showing partial data contents of a control system abnormality cause-and-effect matrix 6 accompanying the system application software 4S of the control system abnormality diagnosis system 1.

Vertical items of the control system abnormality cause-and-effect matrix 6 contain various diagnosing target devices 61 (61a, 61b, . . . ) constituting the control system of the plant, and imagined component abnormality causes 62 (62a1, 62a2, . . . , 62b1, 62b2, . . . , 62c1, 62c2, . . . , 62d1, 62d2, . . . ) of the target devices 61 (61a, 61b, . . . ) arrayed in a corresponding manner.

Horizontal items contain characteristics 63 (63a, 63b, . . . ) of abnormal phenomena, and state data 63a1, 63a2, . . . , 63b1, 63b2, . . . , 63c1, . . . , 63d1, . . . of the characteristics 63 (63a, 63b, . . . ) of the abnormal phenomena.

At cross points between the abnormality causes 62 (62a1, 62a2, . . . , 62b1, 62b2, . . . , 62c1, 62c2, . . . , 62d1, 62d2, . . . ) of the target devices 61 (61a, 61b, . . . ) arrayed in the vertical items of the matrix 6 and the characteristics 63 (63a, 63b, . . . ) of the abnormal phenomena arranged in the horizontal items, weighting scores 64 . . . are distributed in accordance with strengths of cause-and-effect correlations of both.

Figure 9:
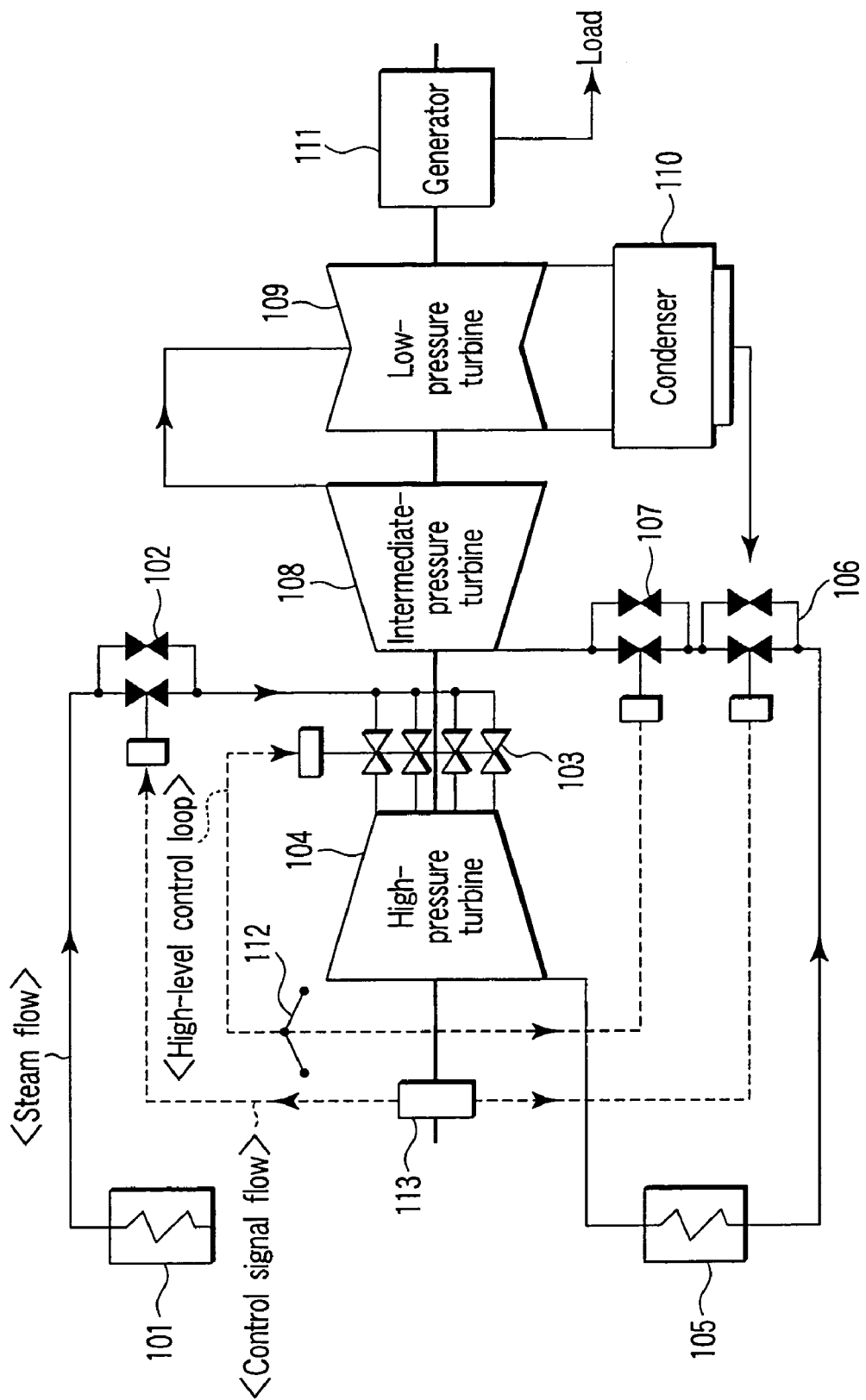
FIG. 9 is a diagram showing a steam flow of a representative steam turbine and a configuration of a device for controlling the flow.

As various target devices 61 (61a, 61b, . . . ) constituting the control system of the plant, as shown in FIG. 9, various hardware devices such as a main stop valve (main stop valve: MSV), a control valve, an intercept valve, a reheat stop valve, a speed governor (GOV), an emergency governor, a synchronizer, and a speed relay (SR) are listed up.

The target devices 61 (61a, 61b, . . . ) are further broken down into abnormality causes 62 (62a1, 62a2, . . . , 62b1, 62b2, ..., 62c1, 62c2, ..., 62d1, 62d2, ...) of components constituting the devices. For example, as abnormality causes 62 of the GOV (speed governor) 61a shown in FIG. 2, experienced abnormality causes such as (1) large resistance of a rotary pilot as a constituting component (62a1), and (2) seating position shifting of a weight spring (62a2) are listed up.

That is, when the characteristics 63 (63a, 63b, ...) of the abnormal phenomena and the state data 63a1, 63a2, ..., 63b1, 63b2, ..., 63c1, ..., 63d1, ... thereof are selectively input in accordance with the control system abnormality cause-and-effect matrix 6, correlation scores 64 are obtained in accordance with cross points with the abnormality causes 62 (62a1, 62a2, ..., 62b1, 62b2, ..., 62c1, 62c2, ..., 62d1, 62d2, ...) of the target devices 61 (61a, 61b, ...) in cause-and-effect relation to the states of the abnormal phenomena. Then, a total of the correlation scores 64 obtained for the target devices 61 (61a, 61b, ...) is calculated, and a primary diagnosis is enabled for narrowing down (estimating) which of the target devices 61 (61a, 61b, ...) are abnormality causes based on a size of the calculated total score.

FIG. 3 is a table showing partial data contents of a control system abnormality cause-and-effect matrix 6' when running states 65 are classified and set for the characteristics 63 (63a, 63b, ...) of the abnormal phenomena in the control system abnormality cause-and-effect matrix 6 of the control system abnormality diagnosis system 1 of FIG. 2.

In this control system abnormality cause-and-effect matrix 6', even if characteristics 63 (63a, 63b, ...) of the abnormal phenomena are similar, strength scores 64 of cause-and-effect relations between the characteristics 63 (63a, 63b, ...) of the abnormal phenomena and the abnormality causes 62 (62a1, 62a2, ..., 62b1, 62b2, ..., 62c1, 62c2, ..., 62d1, 62d2, ...) of the target devices 61 (61a, 61b, ...) are changed in accordance with changes in the running states 65. Thus, it is possible to further improve accuracy of narrowing down (estimating) which of the target devices 61 (61a, 61b, ...) are abnormality causes.

In other words, in the control system abnormality cause-and-effect matrix 6' shown in FIG. 3, even if the characteristics 63 of the abnormal phenomena are similar, in accordance with the running states 65 (running states 1, 2) at the time, it is possible to decide weighting scores 64 for the abnormality causes 62 (62a1, 62a2, ..., 62b1, 62b2, ..., 62c1, 62c2, ..., 62d1, 62d2, ...) of the target devices 61.

For example, when a characteristic 63 of an abnormal phenomenon "sudden load change" is "not recovered from sudden change" 63a, a running state 65 (running state 1) of this time is classified into "under fixed load" 65a1 and "load being changed" 65a2. Further, its running method (running state 2) is classified into "automatic running" 65a11 using the speed governor (GOV), "manual running" 65a12, and "load limit running" 65a13. Based on the classification of the running states 65 (running states 1, 2), it is possible to decide weighting scores 64 ... of the abnormal causes 62 ... in the target device (GOV) 61a.

FIG. 4 is a table showing a control system abnormality cause-and-effect coefficient matrix 6A in which weighting factors 67 are set with respect to the abnormality cause weighting scores 64 when states 66 of associated devices are classified for the characteristics 63 (63a, 63b, ...) of the abnormal phenomena in the control system abnormality cause-and-effect matrix 6 (6') of the control system abnormality diagnosis system 1 of FIG. 2 or FIG. 3.

That is, in the control system abnormality cause-and-effect coefficient matrix 6A shown in FIG. 4, for example, when a sudden load change occurs as an abnormal phenomenon, the abnormality cause weighting score 64 obtained from the control system abnormality cause-and-effect matrix 6 (6') is multiplied by an influence of the state 66, such as the presence 66a of a main steam change or the presence 66b of a system frequency change. Note that the influence of the state 66 is a weighting factor 67. Accordingly, it is possible to further improve the accuracy of narrowing down (estimating) which of the target devices 61 (61a, 61b, ...) are abnormality causes.

For example, when an abnormal phenomenon is "sudden load change", if "presence of main steam change" 66a is "change is present" as the state of the associated device, a weighting factor 67 for each abnormality cause 62 is set to (0.3). The abnormality cause weighting score 64 corresponding to the same abnormal phenomenon "sudden load change" obtained from the control system abnormality cause-and-effect matrix 6 (6') is multiplied by "0.3" to correct a correlation value with the abnormality cause 62. This correlation value correction takes into consideration the possibility that the abnormal phenomenon "sudden load change" has occurred because of the influence of the main steam change.

It is to be noted that in the control system abnormality cause-and-effect coefficient matrix 6A of FIG. 4, the influence of the state 66 of the associated device when the abnormal phenomenon is "sudden load change" is shown with respect to the weighting factor 67. By setting similar control system abnormality cause-and-effect coefficient matrixes (6A) for various other abnormal phenomena, it is possible to further improve the accuracy of narrowing down (estimating) abnormality causes.

Next, an abnormality diagnosis function of the control system abnormality diagnosis system 1 of the turbine plant according to the first embodiment of the aforementioned configuration will be described.

Figure 5:
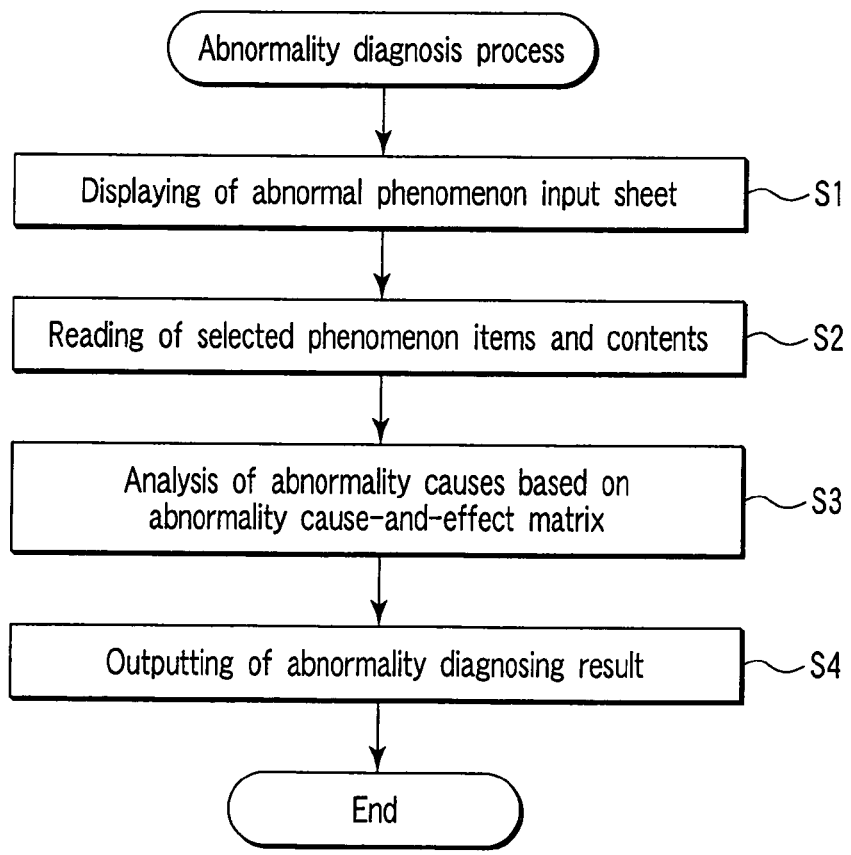
FIG. 5 is a flowchart showing an abnormality diagnosis process based on the system application software 4S of the control system abnormality diagnosis system 1.

FIG. 5 is a flowchart showing an abnormality diagnosis process based on the system application software 4S of the control system abnormality diagnosis system 1.

Figure 6A:
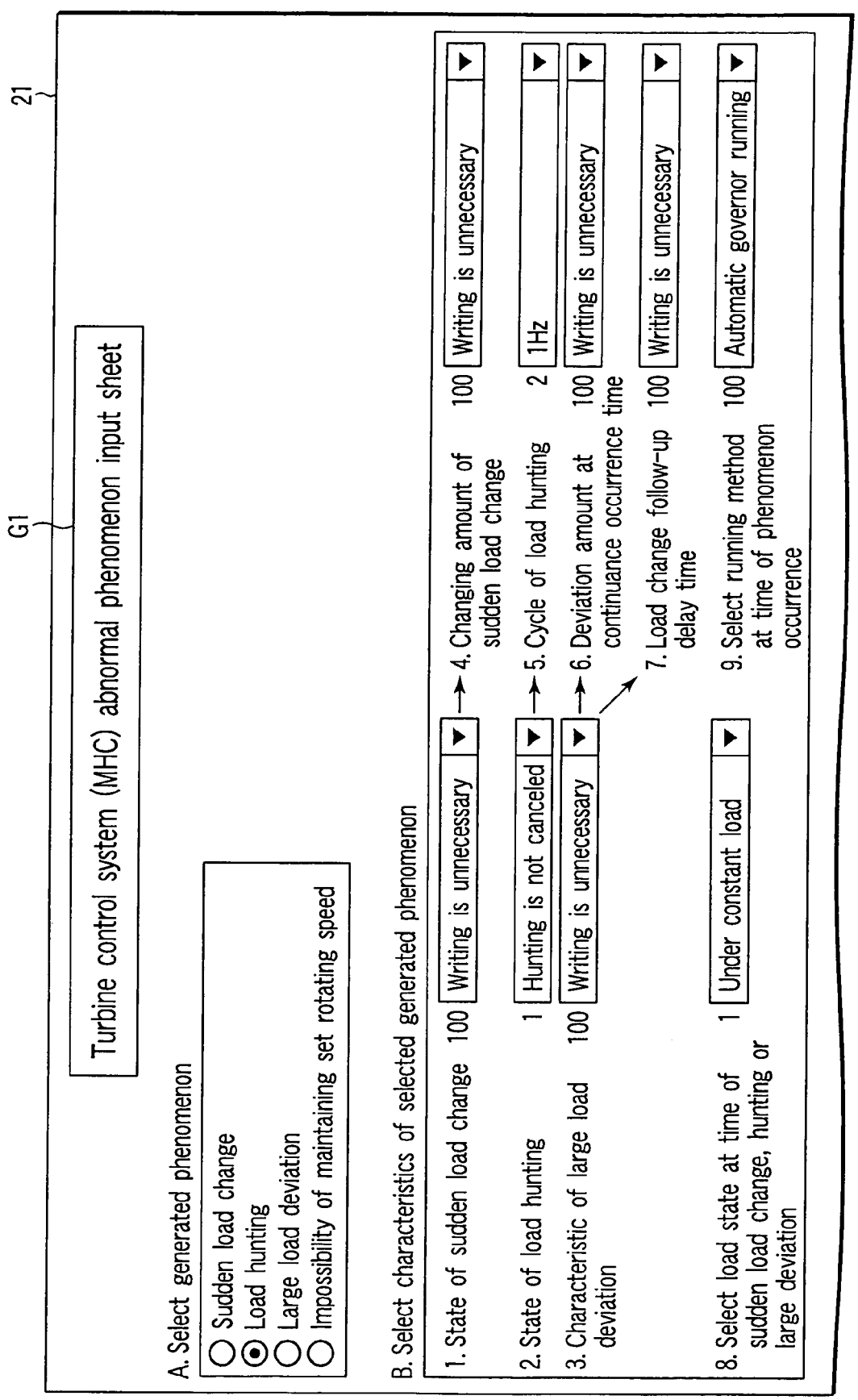
FIG. 6A is a sheet showing an abnormal phenomenon input screen G1 (upper half) displayed in association with the abnormality diagnosis process of the control system abnormality diagnosis system 1.
Figure 6B:
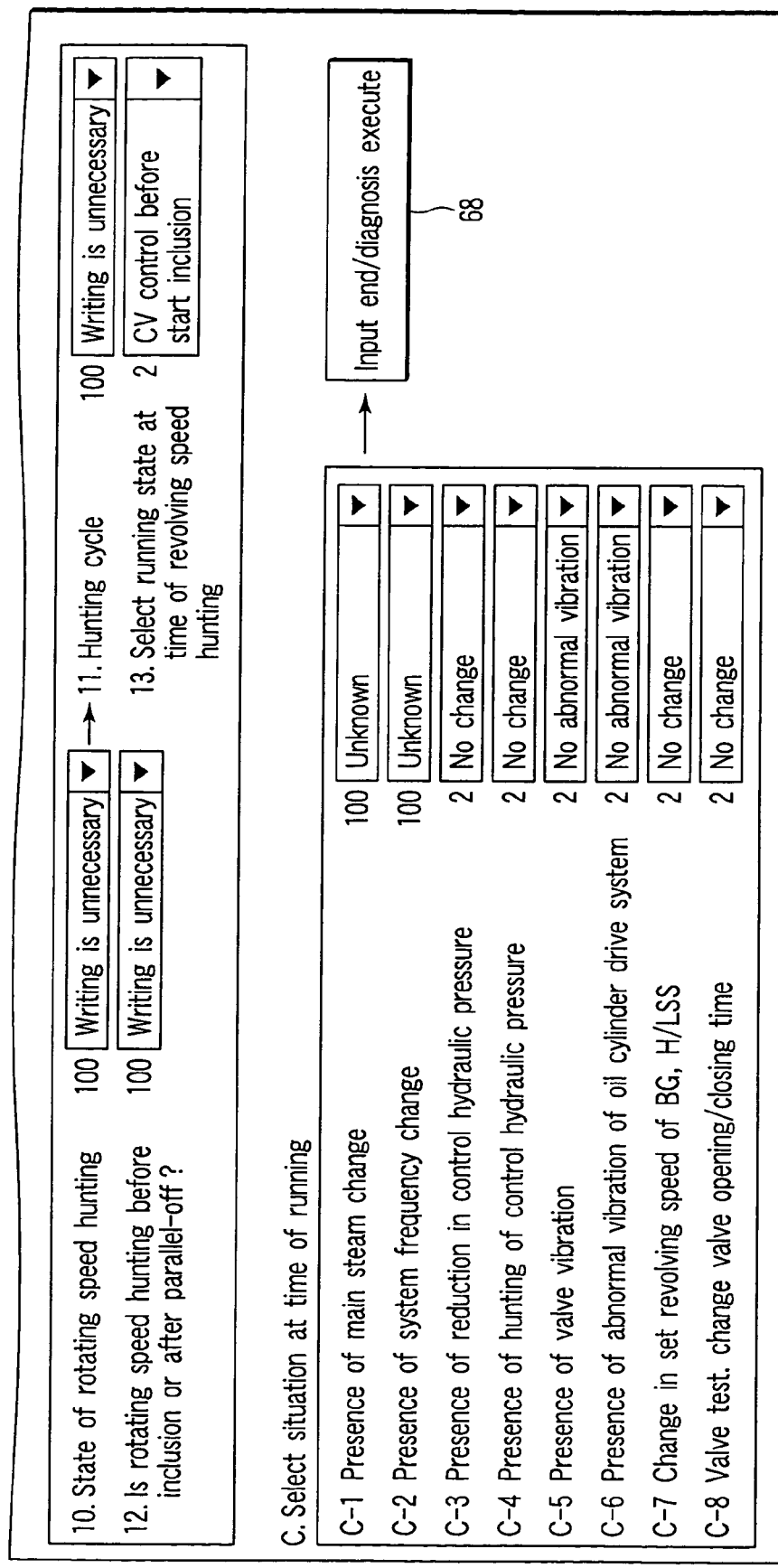
FIG. 6B is a sheet showing an abnormal phenomenon input screen G1 (lower half) displayed in association with the abnormality diagnosis process of the control system abnormality diagnosis system 1.

Each of FIGS. 6A and 6B is a sheet showing an abnormal phenomenon input screen G1 displayed in association with the abnormality diagnosis process of the control system abnormality diagnosis system 1.

When the diagnostic computer (CPU) 3 is started to operate by the personal computer 2 of the control system abnormality diagnosis system 1, the control system abnormality diagnosis system application software 4S prerecorded in the memory 4 is started. For example, as shown in FIGS. 6A and 6B, the abnormal phenomenon input screen G1, showing "turbine control system (MHC) abnormal phenomenon input sheet" is displayed on the monitor 21 of the personal computer 2 (step S1).

In the abnormal phenomenon input screen G1 showing the "turbine control system (MHC) abnormal phenomenon input sheet", the user selects and inputs an abnormal phenomenon A in the turbine control system, a characteristic B of the abnormal phenomenon, or a running state C of this time are selected from preset selection items, in accordance with the horizontal items of the control system abnormality cause-and-effect matrix 6 (6') [see FIG. 2 (FIG. 3)] and the control system abnormality cause-and-effect coefficient matrix 6A [see FIG. 4].

In accordance with the "turbine control system (MHC) abnormal phenomenon input sheet" of the abnormal phenomenon input screen G1, the abnormal phenomenon A, the characteristic B of the abnormal phenomenon, and the running state C are selected and input, and an "input end/diagnosis execute" button 68 is operated. Then, contents of the input items of the abnormal phenomenon A, the characteristic B of the abnormal phenomenon, and the running state C are read into the diagnostic computer 3 (step S2).

Subsequently, based on the control system abnormality cause-and-effect matrix 6 (6') [see FIG. 2 (FIG. 3)] and the control system abnormality cause-and-effect coefficient matrix 6A [see FIG. 4] prerecorded in the memory 4, correlation scores 64 are obtained for abnormality causes 62 . . . corresponding to the selected items of the abnormal phenomenon A, the characteristic B of the abnormal phenomenon, and the running state C read into the diagnostic computer 3. Accordingly, a total value of the abnormality cause correlation scores 64 . . . of the control system target devices 61 (61*a*, 61*b*, . . . ) is calculated. Then, in accordance with the total value of the abnormality cause correlation scores 64 . . . of the target devices 61 (61*a*, 61*b*, . . . ) (e.g., comparison with a predetermined value), possibilities of abnormalities of the devices 61 (61*a*, 61*b*, . . . ) are analyzed (step S3).

Figure 7:
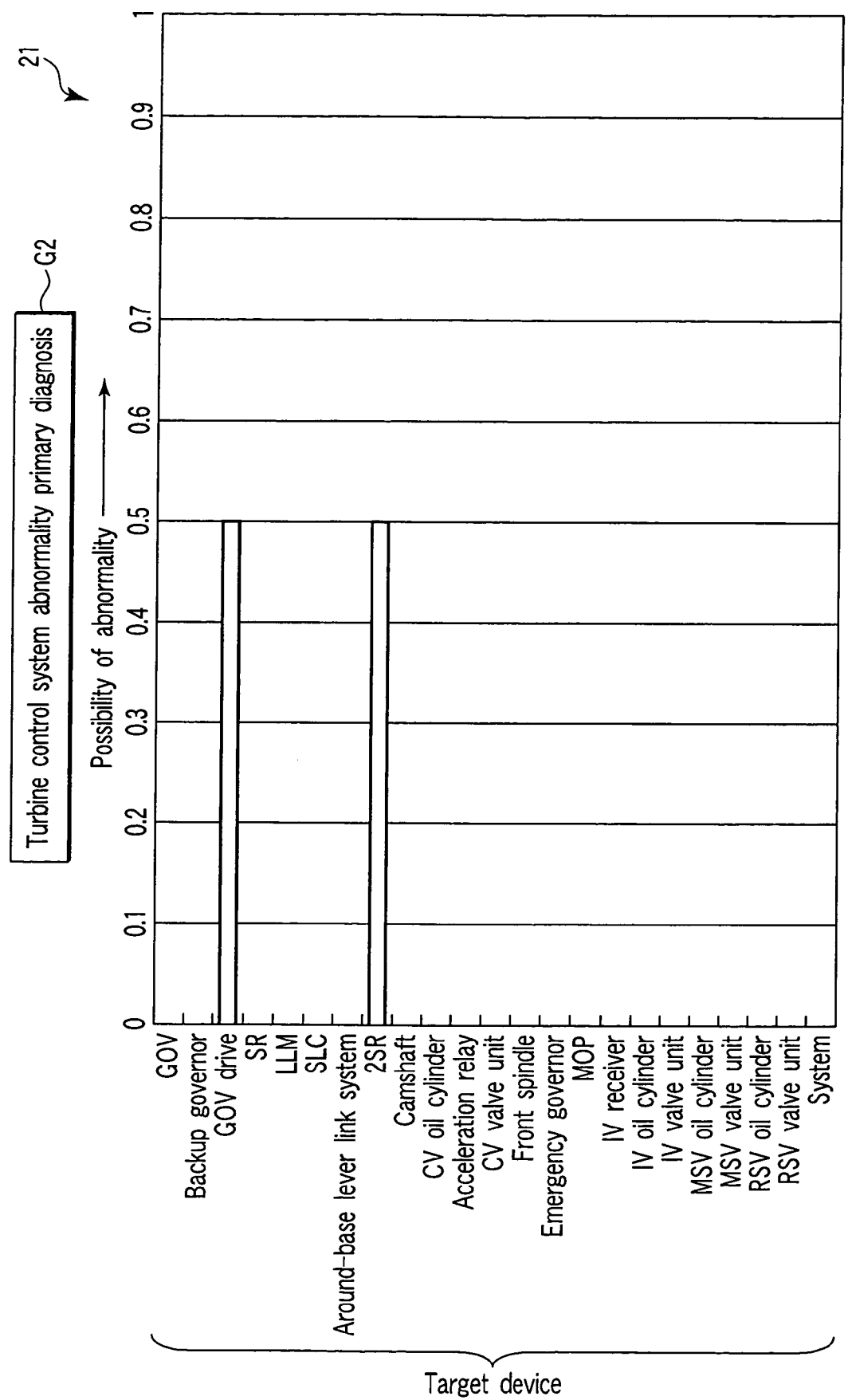
FIG. 7 is a graph showing an abnormality diagnosis screen G2 displayed in association with the abnormality diagnosis process of the control system abnormality diagnosis system 1.

FIG. 7 is a graph showing an abnormality diagnosis screen G2 displayed in association with the abnormality diagnosis process of the control system abnormality diagnosis system 1.

As shown in FIG. 7, the abnormality diagnosis screen G2" of "turbine control system abnormality primary diagnosis", for example, is displayed and output to the monitor 21 in accordance with a diagnosing result of each of the abnormality cause target devices analyzed in the step S3 (step S4).

In the abnormality diagnosis screen G2 "turbine control system abnormality primary diagnosis" shown in FIG. 7, abnormality occurrence possibilities of the diagnosing target devices 61 (61, 61*b*, . . . ) of the turbine control system (MHC) are shown in a numerical value bar graph based on the control system abnormality cause-and-effect matrix 6 (6') [see FIG. 2 (FIG. 3)] and the control system abnormality cause-and-effect coefficient matrix 6A [FIG. 4].

For example, in accordance with the "turbine control system (MHC) abnormal phenomenon input sheet" of the abnormal phenomenon input screen G1, "load hunting occurrence" is selected and input as an abnormal phenomenon A. "Load hunting cycle (1 Hz)" and "load state during hunting (under constant load)" are selected and input as characteristics B of the abnormal phenomenon. Then, "no change in control hydraulic pressure", "no abnormal vibration" or the like is selected and input as a running state C, and the "input end/diagnosis execute" button 68 is operated.

Then, abnormality cause correlation scores 64 . . . and weighting factors 67 are obtained for the target devices 61 (61*a*, 61*b*, . . . ) corresponding to "load hunting" 63*c*, "1 Hz" 63*c*2, and "under constant load" 65*a*1 which are horizontal items of the control system abnormality cause-and-effect matrix 6 (6') [see FIG. 2 (FIG. 3)], "no change in control hydraulic pressure" 66*c*12, "no abnormal vibration" 66*d*2 and the like which are horizontal items of the control system abnormal cause-and-effect coefficient matrix 6A [see FIG. 4].

In accordance with a total value of the abnormality cause correlation scores 64 . . . of the target devices 61 (61*a*, 61*b*, . . . ), abnormality possibilities of the target devices 61 (61*a*, 61*b*, . . . ) are analyzed. For example, as shown in FIG. 7, a primary diagnosing result in which an abnormality possibility is "0.5" at GOV driving, and an abnormality possibility is "0.5" at 2SR is displayed on the abnormality diagnosis screen G2.

Thus, in the abnormality diagnosis function of the turbine plant control system abnormality diagnosis system 1 according to the first embodiment of the aforementioned configuration, each plant user can easily perform a primary diagnosis of the control system abnormality cause of the turbine plant, by using the personal computers. Accordingly, the user can quickly plan a maintenance policy such as a necessity of more detailed cause investigation of control system abnormalities or preferential investigation of devices if detailed investigation is made. The plant user and the manufacturer/service company side can both reduce time and costs for maintenance.

It is to be noted that in the control system abnormality diagnosis system 1 of the first embodiment, the user directly inputs the items of the abnormal phenomena through the user interfaces (21, 22) using the personal computer 2 of the system 1, and thus the control system abnormality diagnosis system application software 4S is started by the diagnostic computer 3 to execute the abnormality diagnosis process.

As described in a next second embodiment (see FIG. 8), the control system abnormality diagnosis system 1 installed on the <diagnosis execution side> can be accessed from a terminal computer (9) of the <diagnosis request side> through a network N using a communication line 11 such as Internet. Even without installing the control system abnormality diagnosis system 1 on each plant user side, when abnormalities occur, an easy primary diagnosis can be made of the control system abnormalities by accessing the control system abnormality diagnosis system 1 installed in the manufacturer or the like through the communication network N.

(Second Embodiment)

Figure 8:
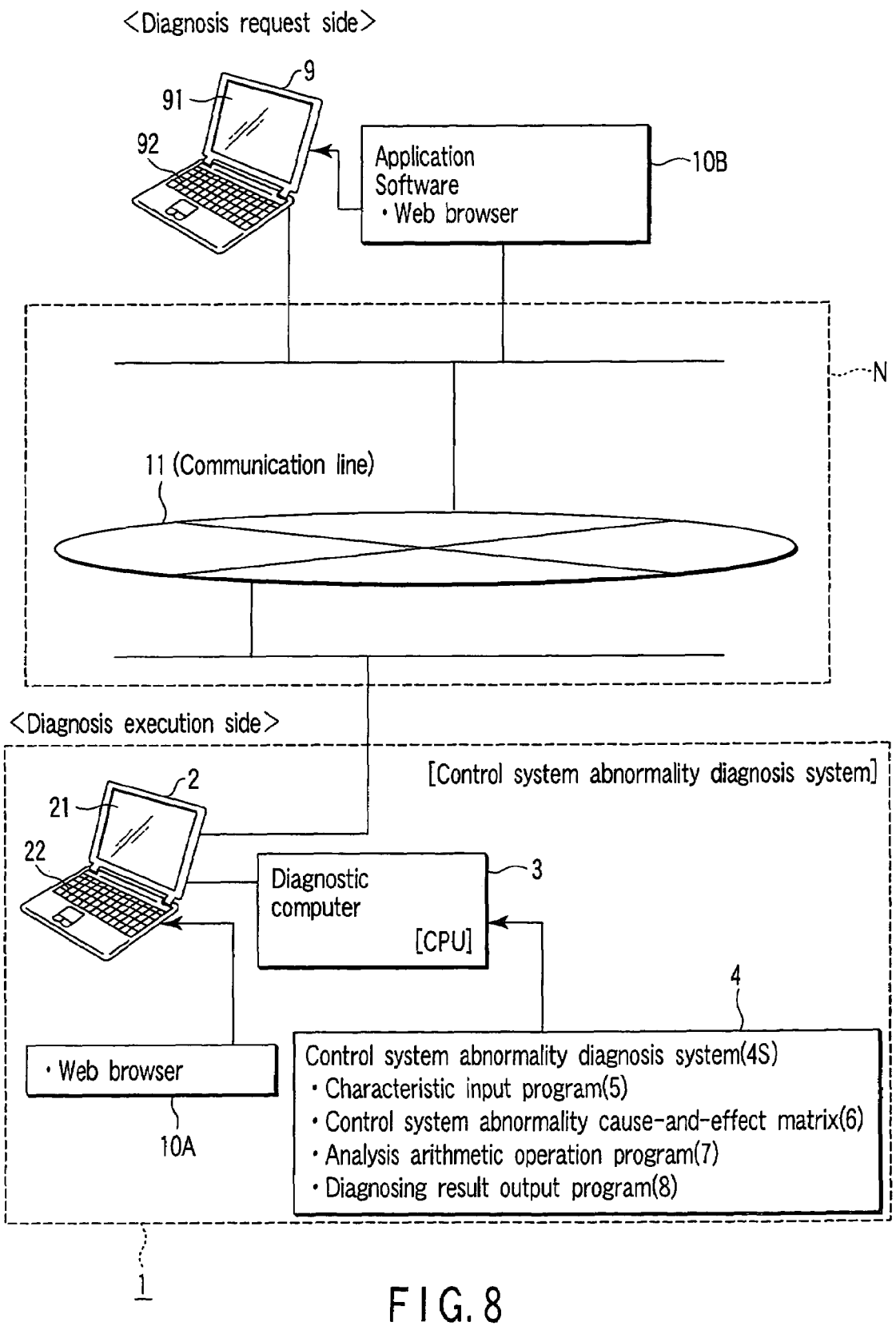
FIG. 8 is a block diagram showing a configuration of the control system abnormality diagnosis system 1 of a turbine plant connected to a network according to a second embodiment of the present invention.

FIG. 8 is a block diagram showing a configuration of a control system abnormality diagnosis system 1 of a turbine plant connected to a network according to a second embodiment of the present invention.

A configuration is employed in which a Web browser 10A is preinstalled in a personal computer 2 of the control system abnormality diagnosis system 1 installed on a <diagnosis execution side> such as a manufacturer to enable access by an external computer terminal through a communication network N.

A computer terminal of a <diagnosis request side> such as a user is configured as a personal computer 9 to enable access through the communication network N by preinstalling a Web browser 10B. When abnormalities occur in the control system, a primary diagnosis can be made of the control system abnormalities by easily accessing the control system abnormality diagnosis system 1 installed on the <diagnosis execution side> such as the manufacturer.

That is, the personal computer 2 of the control system abnormality diagnosis system 1 on the <diagnosis execution side> such as the manufacturer is accessed from the personal computer 9 on the <diagnosis request side> such as the user through the communication network N, and a control system abnormality diagnosis system application software 4S is started by its diagnostic computer 3. In user interfaces such as a monitor 91 and a keyboard 92 of the personal computer 9 of the <diagnosis request side> such as the user, as in the case of the first embodiment, an abnormal phenomenon input screen G1 (see FIGS. 6A and 6B) can be displayed, its selection items can be input, and an abnormality diagnosis screen G2 (see FIG. 7) can be accordingly displayed.

In this case, the plant user side that requests the diagnosis can directly input characteristics of the abnormal phenomena. Accordingly, it is possible to obtain a rough diagnosing result within a short time. Besides, if a more detailed diagnosis is necessary, by displaying its comment on the user side monitor 21, it is possible to easily request a detailed diagnosis when necessary.

Thus, according to the control system abnormality diagnosis system 1 of the turbine plant connected to the network of the second embodiment of the aforementioned configuration, the general-purpose personal computer 9 can be installed in a place of each plant user connected to the communication network N. Thus, each user can easily use abnormality diagnosis services offered by the manufacturer or the like without specifying a place. Moreover, a site trip service engineer of the manufacturer/service company can execute an abnormality diagnosis function using the same communication function, thereby offering quick services.

Each of the embodiments has been described by way of the control system abnormality diagnosis of the turbine plant. However, a plant type is not limited to this. Needless to say, other various plants can be applied by changing contents of the control system abnormality cause-and-effect matrix 6 (6') or the control system abnormality cause-and-effect coefficient matrix 6A.

As the turbine plant that is a diagnosis target of the control system abnormality diagnosis system 1 of each of the embodiments, any one of a gas turbine, a motor turbine, a water turbine and the like can be applied.

Furthermore, even in the case of making more detailed investigation of the abnormality causes as a secondary diagnosis after the primary diagnosis by the control system abnormality diagnosis system 1, by creating a control system abnormality cause-and-effect matrix in accordance with the secondary diagnosis, it is possible to perform the secondary diagnosis by the same method as that of each of the embodiments.

Causes of abnormalities generated in the control system of a power plant or the like are easily diagnosed by a plant operator.

What is claimed is:

1. A control system abnormality diagnosis system of a plant comprising:
   a control system abnormality cause-and-effect matrix in which abnormality causes generated in a plurality of devices constituting the control system of the plant are correlated with characteristics of plural kinds of abnormal phenomena generated in the control system because of abnormalities of the devices for running states of the plant by weighting scores in accordance with correlativity thereof;
   a control system abnormality cause-and-effect coefficient matrix in which for the characteristics of the plural kinds of abnormal phenomena generated in the control system of the plant, weighting factors are set with respect to the abnormality causes generated in the plurality of devices constituting the control system differently for states of associated devices thereof,
   an abnormal phenomenon input element that inputs the characteristics of the abnormal phenomena generated in the control system together with the running state of the plant and the states of the associated devices;
   a cause analysis element that analyzes the abnormality causes generated in the control system of the plant based on the weighting scores obtained by the control system abnormality cause-and-effect matrix and the weighting factors obtained by the control system abnormality cause-and-effect coefficient matrix from the characteristics of the abnormal phenomena input from the abnormal phenomenon input element, the running state of the plant, and the states of the associated devices; and
   a diagnosing result output element that outputs the abnormality causes of the plant analyzed by the cause analysis element as diagnosing results.

2. The control system abnormality diagnosis system of the plant according to claim 1,
   wherein the abnormal phenomenon input element displays the plural kinds of abnormal phenomena generated in the control system, the characteristics of the abnormal phenomena and the running state described in the control system abnormality cause-and-effect matrix, and the states of the associated devices described in the control system abnormality cause-and-effect coefficient matrix item by item, and inputs the characteristics of the abnormal phenomena generated in the control system, the running state of the plant, and the states of the associated devices by selecting the displayed items.

3. The control system abnormality diagnosis system of the plant according to claim 1 or 2, further comprising a communication element connected to an external communication terminal through a network,
   wherein the abnormal phenomenon input element inputs the characteristics of the abnormal phenomena generated in the control system in accordance with communication with the external communication terminal connected by the communication element together with the running state of the plant and the states of the associated devices.

4. A control system abnormality diagnosis system of a plant connected to an external communication terminal through a network, comprising:
   a control system abnormality cause-and-effect matrix in which abnormality causes generated in a plurality of devices constituting the control system of the plant are correlated with characteristics of plural kinds of abnormal phenomena generated in the control system because of abnormalities of the devices for running states of the plant by weighting scores in accordance with correlativity thereof;
   a control system abnormality cause-and-effect coefficient matrix in which for the characteristics of the plural kinds of abnormal phenomena generated in the control system of the plant, weighting factors are set with respect to the abnormality causes generated in the plurality of devices constituting the control system differently for states of associated devices thereof,
   an abnormal phenomenon input element that inputs the characteristics of the abnormal phenomena generated in the control system of the plant together with the running state of the plant and the states of the associated devices from the external communication terminal through the network;
   a cause analysis element that analyzes the abnormality causes generated in the control system of the plant based on the weighting scores obtained by the control system abnormality cause-and-effect matrix and the weighting factors obtained by the control system abnormality cause-and-effect coefficient matrix from the characteristics of the abnormal phenomena input from the abnormal phenomenon input element, the running state of the plant, and the states of the associated devices; and
   a diagnosing result output element that outputs the abnormality causes of the plant analyzed by the cause analysis element as diagnosing results to the external communication terminal through the network.

5. A communication terminal connected to a control system abnormality diagnosis system of a plant through a network, the control system abnormality diagnosis system comprising:

a control system abnormality cause-and-effect matrix in which abnormality causes generated in a plurality of devices constituting the control system of the plant are correlated with characteristics of plural kinds of abnormal phenomena generated in the control system because of abnormalities of the devices for running states of the plant by weighting scores in accordance with correlativity thereof; and a control system abnormality cause-and-effect coefficient matrix in which for the characteristics of the plural kinds of abnormal phenomena generated in the control system of the plant, weighting factors are set with respect to the abnormality causes generated in the plurality of devices constituting the control system differently for states of associated devices thereof, and the communication terminal comprising:

an abnormal phenomenon input element which is connected to the control system abnormality diagnosis system through the network and which inputs the characteristics of the abnormal phenomena generated in the control system of the plant together with the running state of the plant and the states of the associated devices;

an abnormality cause reception element that receives, in response to the characteristics of the abnormal phenomena, the running state of the plant and the state of the associated devices input from the abnormal phenomenon input element, abnormality causes of the plant analyzed based on the control system abnormality cause-and-effect matrix and the control system abnormality coefficient matrix of the control system abnormality diagnosis system; and a diagnosing result output element that outputs the abnormality causes of the plant received by the diagnosing result reception element as diagnosing results.

6. A control system abnormality diagnosis method of a plant comprising:

inputting characteristics of abnormal phenomena generated in the control system together with a running state of the plant and states of associated devices to a control system abnormality cause-and-effect matrix and a control system abnormality cause-and-effect coefficient matrix by using the control system abnormality cause-and-effect matrix in which abnormality causes generated in a plurality of devices constituting the control system of the plant are correlated with characteristics of plural kinds of abnormal phenomena generated in the control system because of abnormalities of the devices for running states of the plant by weighting scores in accordance with correlativity thereof and the control system abnormality cause-and-effect coefficient matrix in which for the characteristics of the plural kinds of abnormal phenomena generated in the control system of the plant, weighting factors are set with respect to the abnormality causes generated in the plurality of devices constituting the control system differently for the states of the associated devices thereof;

analyzing the abnormality causes generated in the control system of the plant based on the weighting scores obtained by the control system abnormality cause-and-effect matrix and the weighting factors obtained by the control system cause-and-effect coefficient matrix from the characteristics of the abnormal phenomena input together with the running state of the plant and the states of the associated devices; and outputting the analyzed abnormality causes of the plant as diagnosing results.

7. The control system abnormality diagnosis method of the plant according to claim 6, wherein the plural kinds of abnormal phenomena generated in the control system, the characteristics of the abnormal phenomena and the running state described in the control system abnormality cause-and-effect matrix, and the states of the associated devices described in the control system abnormality cause-and-effect coefficient matrix are displayed item by item, and the characteristics of the abnormal phenomena generated in the control system, the running state of the plant, and the states of the associated devices are input by selecting the displayed items.

8. The control system abnormality diagnosis method of the plant according to claim 6 or 7, wherein the characteristics of the abnormal phenomena generated in the control system are input together with the running state of the plant and the states of the associated devices in accordance with communication with an external communication terminal connected by a communication element.

* * * * *